United States Patent [19]

Goller et al.

[11] 4,233,181
[45] Nov. 11, 1980

[54] AUTOMATED CATALYST PROCESSING FOR CLOUD ELECTRODE FABRICATION FOR FUEL CELLS

[75] Inventors: Glen J. Goller, West Springfield, Mass.; Richard D. Breault, Coventry, Conn.

[73] Assignee: United Technologies Corporation, Hartford, Conn.

[21] Appl. No.: 43,917

[22] Filed: May 30, 1979

[51] Int. Cl.³ .................. H01M 4/88; H01M 4/04; H01M 4/96
[52] U.S. Cl. .................. 252/425.3; 264/122; 264/127; 425/84; 425/85; 427/115; 429/42
[58] Field of Search ............ 252/425.3, 428, 430, 252/477 R; 429/42; 427/115; 264/122, 127, 517, 571; 425/84, 85

[56] References Cited

U.S. PATENT DOCUMENTS

| | | | |
|---|---|---|---|
| 4,031,033 | 6/1977 | Budevski et al. | 252/425.3 |
| 4,043,933 | 8/1977 | Breault et al. | 429/42 |
| 4,129,633 | 12/1978 | Biddick | 264/127 |

FOREIGN PATENT DOCUMENTS 1163479  9/1969  United Kingdom ............ 429/42

Primary Examiner—P. E. Konopka
Attorney, Agent, or Firm—Stephen E. Revis

[57] ABSTRACT

A process for making dry carbon/polytetrafluoroethylene floc material, particularly useful in the manufacture of fuel cell electrodes, comprises of the steps of floccing a co-suspension of carbon particles and polytetrafluoroethylene particles, filtering excess liquids from the co-suspension, molding pellet shapes from the remaining wet floc solids without using significant pressure during the molding, drying the wet floc pellet shapes within the mold at temperatures no greater than about 150° F., and removing the dry pellets from the mold.

11 Claims, 2 Drawing Figures

AUTOMATED CATALYST PROCESSING FOR CLOUD ELECTRODE FABRICATION FOR FUEL CELLS

The Government has rights in this invention pursuant to Contract No. EX-76-C-01-2102 awarded by the Department of Energy.

BACKGROUND OF THE INVENTION

1. Field of the Invention

This invention relates to materials particularly useful in the manufacture of electrochemical cell electrodes.

2. Description of the Prior Art

Electrodes for use in electrochemical cells, such as fuel cells, are well known in the art. One common type of electrode is the gas diffusion electrode. A pair of gas diffusion electrodes are disposed on either side of a compartment containing a matrix which is soaked with electrolyte. A catalyst is disposed on the electrolyte facing surface of each electrode. Hydrogen is fed to the other side of one electrode while oxygen or air is fed to the other side of the other electrode. The gasses enter the electrodes and react with the electrolyte in the presence of the catalyst.

One type of gas diffusion electrode comprises a layer of polytetrafluoroethylene (PTFE) particles combined with a catalyst supported on carbon particles (i.e. catalyzed carbon), said layer being disposed on the surface of a porous carbon substrate (e.g. carbon paper). The PTFE prevents the electrolyte from filling up the electrode to such an extent that sufficient fuel or oxident cannot reach the catalyst. A gas diffusion electrode of this type is described in column 5 of commonly owned U.S. Pat. No. 3,857,737 to Kemp et al. The electrode may also be made by applying, to the surface of the carbon paper, a layer of uncatalyzed carbon particles combined with PTFE particles. Unsupported catalyst is then applied to this carbon/PTFE layer in a subsequent step. An electrode of this type is described in commonly owned U.S. Pat. No. 3,972,735 to Breault.

The most common methods for applying the carbon/PTFE layer (using either catalyzed or uncatalyzed carbon) are wet application methods. For example, carbon powder (catalyzed or uncatalyzed) and an aqueous PTFE dispersion are blended into an alcohol/water solution to form a co-suspension of carbon and PTFE therein. The suspension is caused to floc, such as by heating or adding a floccing agent. Floccing is the coalescence of the catalyzed or uncatalyzed carbon particles with the PTFE particles. A proper floc is one which achieves uniform size agglomerates of catalyzed or uncatalyzed carbon and PTFE particles and a homogeneous distribution or mix of the particles. In the direct filtration method the floc suspension is applied to the surface of a carbon paper electrode substrate which acts as a filter. Liquids pass through the substrate and a layer of the desired solids mixture (i.e. the floc) remains on the surface of the substrate. The article is then dried, compacted, and sintered. If the applied layer does not include a catalyst, a separate catalyst application step is then required.

A related technique is the indirect filtration (or filter transfer) method wherein the floc suspension is filtered through special filter paper instead of onto the carbon paper substrate. The wet floc is then transferred from the filter paper onto the carbon paper substrate, and is dried, compacted and sintered as in the direct filtration method.

Another technique for applying either the catalyzed carbon/PTFE layer or the uncatalyzed carbon/PTFE layer to an electrode substrate, called the dry floc method, is described in commonly owned U.S. Pat. Application Ser. No. 920,036 titled DRY FLOC METHOD FOR MAKING AN ELECTROCHEMICAL CELL ELECTRODE, Goller et al, filed on June 28, 1978, which is incorporated herein by reference. In that method carbon powder (catalyzed or uncatalyzed) and an aqueous PTFE dispersion are blended into an alcohol/water solution to form a co-suspension of carbon and PTFE therein. The suspension is caused to floc, such as by heating or adding a floccing agent. (If the carbon particles are catalyzed with platinum a small amount of phosphoric acid may be added at this point to inhibit burning of the catalyst layer during sintering of the electrode.) The excess liquid is removed by filtration and the wet floc is then dried and pulverized to a fine powder. The dry floc powder is applied to the surface of an electrode substrate by dispersing the powder as a cloud in a chamber over the substrate and pulling the powder onto the substrate by drawing a vacuum under the substrate. The electrode is subsequently compacted and sintered.

In practicing this dry floc method for making electrodes several problems have been experienced in the handling and storage of the powdered dry floc material, particularly in efforts to use the dry floc powder in a completely automated electrode manufacturing procedure. For example, the dry floc powder tends to agglomerate to larger particle size due to the PTFE components of the floc. This problem is compounded if phosphoric acid is added during the formulation of the floc, since the acid causes the dry floc powder to absorb moisture and the moist floc is tacky. That is one reason why the above mentioned co-pending Goller et al application recommends that the dry floc powder be introduced into the cloud chamber directly from the grinding apparatus. If the powder is simply collected from the grinding apparatus and stored, it would most likely require regrinding. In any case, the dry floc powder is quite difficult to work with, particularly in automated equipment, since the powder does not flow freely from hoppers and tends to stick to the wall surfaces of automated materials handling equipment, such as automatic weighing apparatus. Storing irregular shaped chunks of dry floc which are broken from a large sheet is also not satisfactory because the pieces tend to absorb excessive moisture (due to the presence of acid) during storage and cannot be ground properly because of this excess moisture. Automatic weighing of irregular shapes is also not very precise. Cutting a flat sheet of dry floc into small pieces results in densified material along the cut lines which ultimately adversely affects the properties of the applied dry floc layer.

SUMMARY OF THE INVENTION

One object of the present invention is a dry carbon/PTFE floc material which can be stored for long periods without adverse effects.

Another object of the present invention is a dry carbon/PTFE floc material which can be used with automated weighing and materials handling equipment and be directly applied to electrode substrates in a continuous operation.

A further object of the present invention is a dry carbon/PTFE floc material which has a reduced tendency to agglomerate or absorb moisture.

Accordingly, the present invention is a process for making a dry carbon/PTFE floc material comprising the steps of floccing an aqueous co-suspension of carbon particles and PTFE particles; molding, without significant pressure, dry floc pellets by (1) filtering excess liquids from the flocced suspension, (2) forming the wet flocced solids into pellets within mold cavities, and (3) drying the wet floc material within the mold cavities at temperatures no greater than about 150° F.; and, removing the pellets from the mold.

It is critical, in this process, that the molding of the pellets be accomplished without the application significant pressure, and that the drying of the pellets be done at temperatures no greater than about 150° F. The use of pressure to mold the pellets would result in pellets which are too dense to be ground properly. Excessive drying temperatures, for some reason which is not yet understood, also have a negative effect on the ultimate properties of the carbon/PTFE floc layer which is eventually applied to the electrode substrate. We found, for example, that a drying temperature of 180° F. is too hot.

One of the most important features of the pellets of the present invention is that the floc material inside the pellets has a greatly reduced tendency to agglomerate. This is because the outer surfaces of these pellets are somewhat hardened as compared to the material in the center of the pellets; and this outside shell of material acts like a protective cover. The outer shell also significantly reduces the rate at which this material absorbs moisture, which is very important. The material, therefore, may be stored for long periods of time without its properties being adversely affected.

The dry floc pellets made by the process of the present invention are particularly useful in a continuous process for making electrodes. In a preferred manufacturing procedure the pellets are taken from storage and poured into a hopper which automatically feeds them into the bucket of a weighing device which is pre-set to automatically dump the proper weight of pellets into grinding apparatus. From the grinding apparatus the powder is applied directly to the surface of a suitable electrode substrate such as by the method described in the above referenced Goller et al co-pending patent application.

For ease in forming the finished electrode, it is preferred that the carbon used to make the dry floc be catalyzed to save the step of catalyzing the electrode after the carbon/PTFE layer is applied to the substrate. Platinum is the preferred catalyst and many techniques are well known in the art for applying high surface area platinum to the surface of carbon particles. Platinum disposed on carbon particles is referred to in the art as supported platinum. Examples of U.S. patents which describe methods which may be used for supporting platinum on carbon particles are U.S. Pat. Nos. 3,857,737, 4,044,193, and 4,136,059.

DESCRIPTION OF A PREFERRED EMBODIMENT

Figure 1:
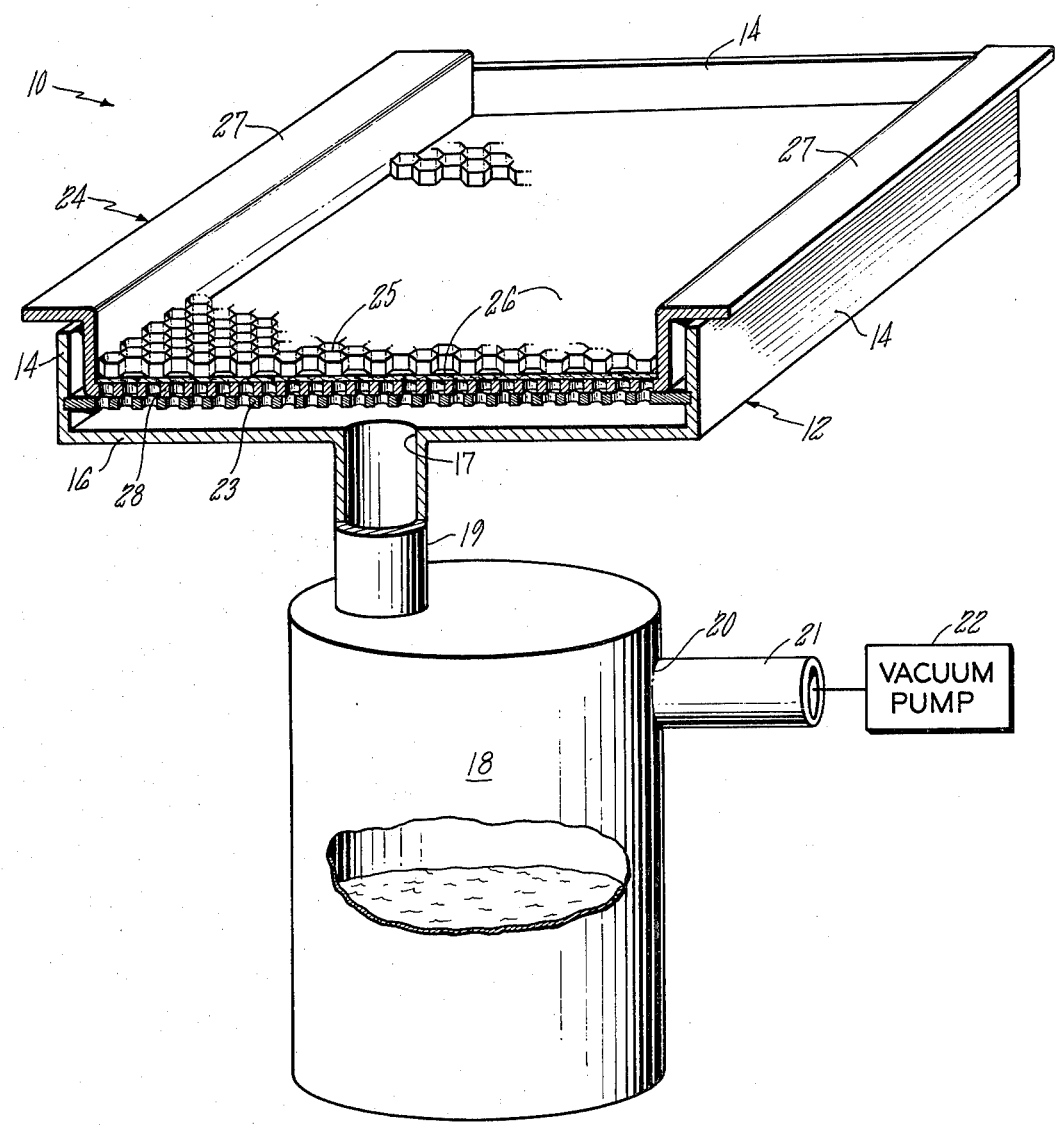
FIG. 1 is a cross-sectional view, partly schematic, showing the dry floc molding apparatus of the present invention.

FIG. 1 shows the apparatus used to mold the dry floc pellets of the present invention. The molding apparatus is generally represented by the numeral 10. The molding apparatus 10 comprises a container 12 having side walls 14, a bottom 16 and outlet 17. The outlet 17 is connected to a reservoir 18 by a tube 19. An outlet 20 of the reservoir is connected by a tube 21 to a vacuum pump 22. Spaced above the bottom 16 is a stationary perforated shelf 23. The apparatus 10 also includes a holder 24, a pellet mold 25, and a sheet of filtering medium 26. The holder 24 comprises handles 27 and a perforated bottom 28.

In this embodiment all of the components of the apparatus 10 are made from stainless steel except for the filter medium 24 which is carbon paper. Carbon paper is a paper made from carbon fibers and a binder. One suitable paper is identified by the manufacturer's product number MF-434 manufactured by Stackpole Company of St. Mary's, Pennsylvania. This paper is about 0.016 in. thick with a porosity of about 80% and a pore size of less than 20 microns. The mold 25 has a honeycomb configuration with cavities which are about 0.5 in. in height with a regular hexagonal cross-section having a perpendicular distance between parallel sides of about 0.375 in. While the shape of the mold cavities is not critical, it is preferred that the pellets made by the present process be quite small so that small quantities may be weighed automatically with considerable precision. Using the honeycomb mold just described and the materials and procedure which follows, pellets which weigh approximately ¼ gram each are obtained.

In manufacturing precatalyzed dry floc pellets of the present invention, an aqueous suspension of catalyzed carbon particles and PTFE particles are first formed in the usual manner. The solids in the co-suspension may include anywhere from 40–70%, by weight, catalyzed carbon with the balance being PTFE. It is preferred that the solids comprise between 50 and 60% catalyzed carbon. The co-suspension is caused to floc, such as by heating or adding a floccing agent. If heating is used, the co-suspension is allowed to return to room temperature before proceeding in order to assure that sufficient time has been given to permit completion of the floccing. During this cooling period the co-suspension is continuously stirred to keep the floc material in suspension. The vacuum pump 22 is then turned on and the floc suspension is poured into the mold 25. The liquid drains through the filtering medium 26, the bottom 28 of the holder 24, and the shelf 23. It falls into the container 12 and from there into the reservoir 18 via the outlet 17 and the tube 19. The vacuum pump 22 creates a slight suction under the mold 25 for the purpose of more quickly drawing the liquid through the filter medium 26. Wet solids are left behind in the mold cavities.

After allowing sufficient time for all the excess liquid to drain from the mold, the holder 24 including the honeycomb mold 25 and the filtering medium 26 is removed from the container 12. The mold 25 and filtering medium 26 are slid from the holder 24 onto a rack in a drying oven. The wet floc is dried slowly at a temperature which must not exceed about 150° F. For best results the drying temperature should not exceed about 120° F. For unknown reasons, drying temperatures which are too high result in pellets which do not grind properly and catalyst layers which are not satisfactory.

As earlier discussed, as the pellets dry a thin shell forms on the outside which prevents agglomeration of the material inside the shell and also significantly reduces the extent to which the pellets absorb moisture. When drying is finished the pellets are dumped from the mold. They fall out easily since the material shrinks considerably upon drying. The pellets are then stored in a steel container until needed. The pellets are easily handled and accurately weighed and transported using automated equipment in an electrode fabrication process as described below.

Figure 2:
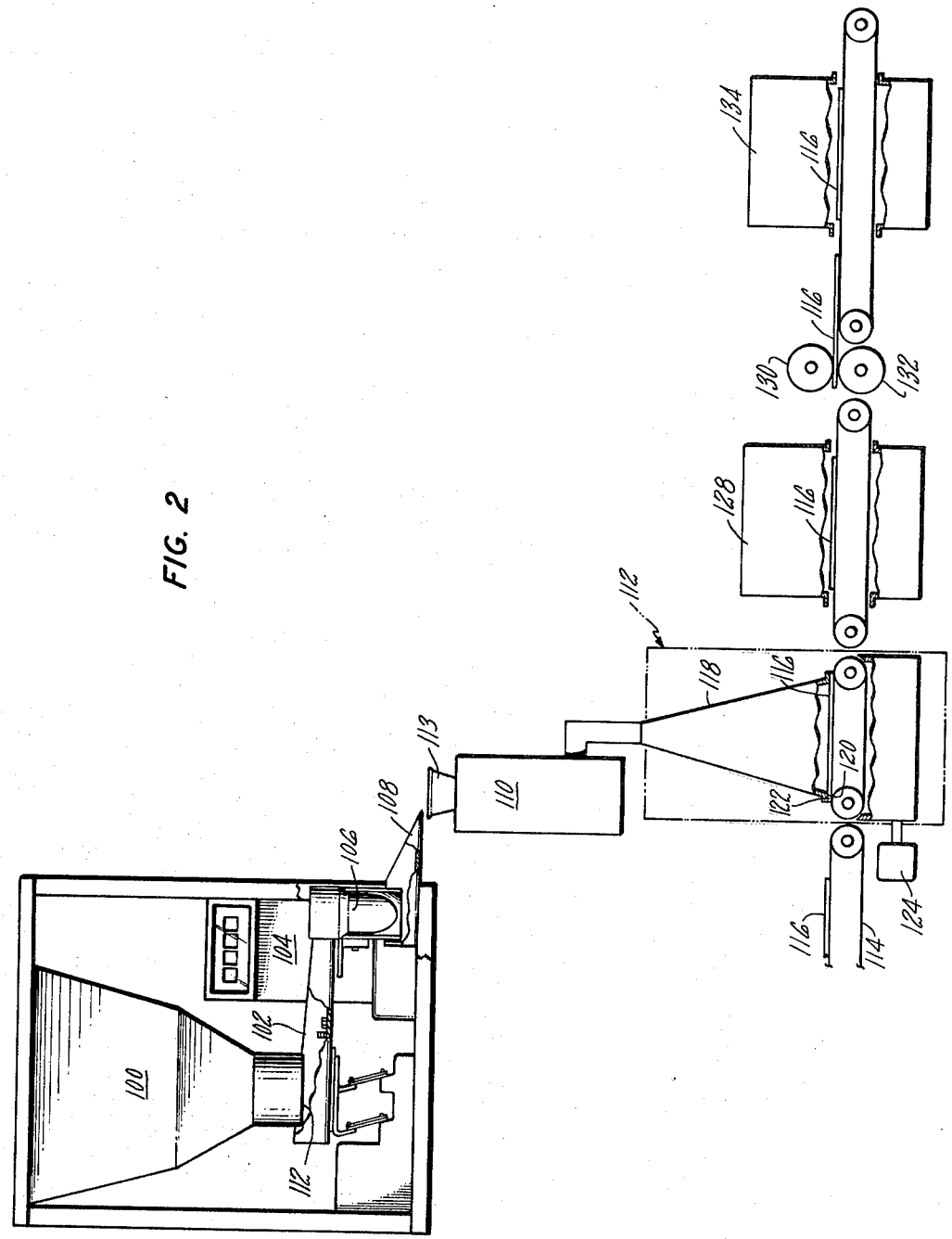
FIG. 2 is a simplified plan view, partly schematic, showing the automated electrode fabrication apparatus of the present invention.

In the making of an electrode utilizing the pellets of the present invention reference is now made to FIG. 2. FIG. 2 shows an automated system for applying a catalyst layer to the surface of an electrode substrate. The system includes a hopper 100, a first vibrating trough 102, an automatic weighing scale 104 including a balance-dump bucket 106, a second vibrating trough 108, grinding apparatus 110, and cloud chamber 112.

In operation, the hopper 100 is filled with the dry floc pellets. These pellets pour into the first vibrator trough 102 through a relatively large opening 112 in the bottom of the hopper 100. The pellets move down the vibrating trough 102 and fall into the balance-dump bucket 106. The scale 104 is set so that the bucket 106 dumps its load into the second vibrating trough 108 when the appropriate weight of pellets has fallen into the bucket. When this happens the vibrating motor for the trough 102 is automatically shut off and the pellets immediately stop moving along the trough 102. Since the opening 112 is disposed within the confines of the trough 102, the opening becomes blocked with pellets when the vibrating motor is turned off, and the pellets stop falling from the hopper 100. The vibrator for the trough 102 is not turned on again until a certain sequence of events has occurred downstream such that the downstream apparatus is ready to handle another load of pellets.

The scale is set to weigh out and dump, into the trough 108, precisely the amount of pellets needed to apply a certain catalyst loading onto the surface of a single electrode substrate. These pellets move along the trough 108 and fall into a funnel 113, which feeds the pellets into the grinding apparatus 110. If the pellets contain platinum it is preferred to grind them in a nitrogen atmosphere to minimize the possibility of a fire initiating in the highly reactive catalyst.

The remaining steps are the same as those described in the hereinabove referred to copending Goller et al patent application. As described therein, it is preferred to grind the pellets in two steps. First the pellets are reduced to a relatively coarse powder using a Bantam Model W Mikro-Pulverizer with a 60 mesh screen, manufactured by Pulverizing Machinery Division of Mikropul, Summit, N.J. The output powder from the Mikro-Pulverizer is fed directly into a Jet-O-Mizer manufactured by Fluid Energy Processing and Equipment Company, of Hatfield, Pennsylvania. In the Jet-O-Mizer the floc particles are further reduced to micron size and less. The step of reducing the floc particles to a suitably small size is more fully described and discussed in co-pending, commonly owned U.S. Pat. Application Ser. No. 920,035 titled CATALYTIC MATERIAL FOR FUEL CELL ELECTRODES by R. Singer, filed on June 28, 1978, which is incorporated herein by reference. As discussed therein, it is preferred that the floc particles have a mean size no greater than about one micron and a maximum size of about five microns.

Meanwhile, a conveyor belt 114 moves an electrode substrate 116 into position under the pyramid like chamber 118 of the cloud chamber apparatus 112. Suitable mechanical means, not shown, serves to move the substrate 116 relative to the chamber 118 such that the bottom edge 120 of the chamber fits tightly against the outside edge 122 of the substrate. A turbine 124 provides a controlled vacuum pressure under the substrate 116. When the turbine 124 is turned on the pre-weighed and pulverized powder from the apparatus 110 is drawn into the chamber 118 via the conduit 126 and is quickly drawn to the exposed surface of the substrate 116. The substrate is held in a position with the vacuum on for a long enough time to ensure that essentially all the measured amount of powder admitted into the chamber 118 has been deposited on the substrate or has passed therethrough. Since the amount which passes through is essentially constant for a particular type of substrate, the proper amount of powder to be introduced into the chamber 118 to achieve a desired catalyst loading or layer thickness may be precisely determined with a few trial runs. The scale 104 is adjusted to weigh out this amount of dry floc pellets.

After application of the appropriate amount of powder to the substrate, the substrate is automatically moved through subsequent stages of the electrode fabrication process, which, in this embodiment, comprise a relatively low temperature drying step in an oven 128, followed by a compacting step at rollers 130, 132, and a high temperature sintering step in oven 134.

EXAMPLE

The following recipe and procedure is for preparing a quantity of dry floc pellets in accordance with the present invention sufficient to manufacture approximately 70 electrodes, each having an area of about 1 square foot.

1. Add 32.2 liters of distilled water to a 15 gallon stainless steel mixing vat having a variable speed agitator disposed in the center thereof.

2. Into a commercial Waring blender containing 3.3 liters of distilled water, slowly add 122.5 grams of catalyzed carbon powder. A suitable catalyzed carbon powder comprises 10% by weight platinum and 90% by weight carbon. Blend at high speed for ten minutes. Pour the blended contents into the aforementioned steel vat with the impeller set for high speed agitation. A swirling vortex is an indication of proper blending speed.

3. Repeat 2 using the same proportions of materials, and after adding to the vat continue the high speed mixing in the vat for 20 minutes.

4. To 2.576 liters of water in a five-liter beaker add 223 milliliters of TFE-30, an aqueous dispersion of polytetrafluoroethylene containing 60% solids manufactured by Dupont Co. Stir by hand.

5. Very gradually (over a period of about 1-2 minutes) pour the PTFE dispersion into the swirling vortex of the vat and turn down the impeller speed to permit moderate agitation. The vat now contains a co-suspension of catalyzed carbon particles and PTFE particles.

6. Heat the contents of the vat up to 135° F. while continuously stirring. This heating causes the co-suspension to floc. Immediately remove the vat from the heat at the 135° F. temperature point and transfer its contents into a clean vessel at room temperature. The suspension should be allowed to reach room temperature and should be continuously stirred in the new vessel to keep the floc in suspension until ready for filtration.

7. Add 67 milliliters of 85% H$_3$PO$_4$ to the floc suspension approximately 5–10 minutes prior to filtration. The purpose of the acid is explained hereinafter.

8. With reference to FIG. 1, the vacuum pump 22 is turned on and the suspension is poured into the honeycomb mold 25. The vacuum pressure in this instance, is only about 5.0 inches of water. The bulk of the liquids are drawn through a carbon paper filter medium 26 into the container 12. Uncompressed wet floc remains behind within the mold cavities. Enough suspension is poured into the mold to insure that the cavities are substantially filled with the wet floc material. Since the precise size of the finished pellet is not critical, it does not really matter that the mold is perfectly uniformly filled with the wet floc.

9. The holder 20 is lifted from the container 12 using the handles 27. The carbon paper 26 and filled mold 25 are slid from the holder onto a rack in an oven, and the wet floc is then dried at 120° F. It is preferred to dry the floc until its moisture content is less than about 5% by weight. It is difficult to reduce the moisture content to much less than 5%, and furthermore, it is not necessary to do so. In this example the finished dry floc pellets comprise 55% by weight catalyzed carbon and 45% PTFE.

The phosphoric acid used during floc preparation is solely for the purpose of inhibiting burning of the electrodes during the high temperature sintering step in the oven 134. It was determined that, at the sintering temperatures which were being used, the platinum in the electrode catalyzed the burning of carbon in the presence of air. The addition of a small amount of phosphoric acid during floc preparation virtually eliminated this burning problem. Phosphoric acid coats the pre-catalyzed carbon particles thereby reducing the surface area available to oxidation. A disadvantage of using phosphoric acid during the floc preparation is that the dry floc, after grinding, picks up moisture which must be removed prior to compacting the catalyst layer to prevent separation of the catalyst layer from the substrate during compaction. The oven 128 is incorporated into the process for the purpose of removing this moisture. The dry floc pellets themselves, even with the phosphoric acid, are relatively resistant to moisture absorption during storage. It is only during the short time between the grinding of the pellets and compacting of the applied catalyst layer that the moisture absorbing problem presents itself.

Although the invention has been shown and described with respect to a preferred embodiment thereof, it should be understood by those skilled in the art that other various changes and ommissions in the form and detail thereof may be made therein without departing from the spirit and the scope of the invention.

Having thus described a typical embodiment of our invention, that which we claim as new and desire to secure by Letters Patent of the United States is:

1. The method of making an electrochemical cell catalyst material comprising the steps of:
    forming an aqueous co-suspension of polytetrafluoroethylene particles and catalyzed carbon to form a floc suspension;
    forming pellet shapes within a mold, the mold including a plurality of pellet shaped cavities with a porous filter medium forming the bottoms of the cavities, the step of forming pellet shapes including filling the mold cavities with the floc suspension and filtering out the excess liquids through the filter medium without the application of significant pressure leaving uncompressed wet floc solids within the mold cavities;
    drying the pellet shapes within the mold cavities at temperatures no greater than about 150° F. for form dry, uncompressed floc pellets; and
    removing the pellets from the mold cavities.

2. The method according to claim 1 wherein the drying temperature is no greater than about 120° F.

3. The method according to claim 1 wherein the filter medium is carbon paper.

4. The method according to claim 2 wherein the step of filtering includes drawing a vacuum under said filter medium.

5. The method according to claim 4 wherein, after the step of floccing, phosphoric acid is added to the co-suspension.

6. The method according to claim 4 wherein the solids in the floc suspension comprise between 40 and 70% by weight catalyzed carbon and a balance of polytetrafluoroethylene.

7. The method according to claim 5 wherein the solids in the floc suspension comprise between 50 and 60% by weight catalyzed carbon.

8. In a method for applying a catalyst layer to the surface of electrochemical cell electrode substrates, the steps of:
    forming an aqueous co-suspension of catalyzed carbon particles and polytetrafluoroethylene particles;
    causing the carbon particles and polytetrafluoroethylene particles to floc and maintaining the floc in suspension;
    forming the floc into pellet shapes at essentially atmospheric pressure by pouring the suspension into a mold comprising a plurality of pellet shaped mold cavities with a porous filter medium forming the bottoms of the mold cavities, drawing a vacuum under the filter medium to draw excess liquid through the filter medium, wherein substantially uncompressed wet floc solids remain behind in the mold cavities;
    drying the pellet shapes within the mold cavities at temperatures no greater than about 120° F. to form dry, uncompressed floc pellets;
    removing the dry floc pellets from the mold;
    placing the pellets in a hopper;
    automatically feeding, at spaced intervals, a predetermined amount of pellets from the hopper into grinding apparatus, the pre-determined amount of pellets being the amount necessary to apply a dry floc layer of certain catalyst loading to a single electrode substrate;
    grinding the predetermined amount of pellets in the grinding apparatus to form a powder having a maximum floc particle size of about 5 microns;
    applying the powder in dry form, as a uniform layer, directly from the grinding apparatus onto the surface of an electrochemical cell electrode substrate;
    compacting the layer; and
    sintering the layer.

9. The method according to claim 8 wherein the filter medium is carbon paper.

10. The method according to claim 8 wherein after causing the carbon particles and polytetrafluoroethylene particles to floc and before forming the floc into pellet shapes, the step of adding phosphoric acid to the floc suspension.

11. The method according to claim 8 wherein the step of automatically feeding a predetermined amount of pellets into grinding apparatus includes feeding pellets from the hopper to an automatic weighing device, weighing out said predetermined amount of pellets, and feeding the weighed out predetermined amount of pellets into the grinding apparatus.

* * * * *